United States Patent
Mittler et al.

(10) Patent No.: US 6,631,908 B2
(45) Date of Patent: Oct. 14, 2003

(54) COMPRESSION PISTON RING

(75) Inventors: Richard Mittler, Hürth (DE); Mario Solia, Köln (DE)

(73) Assignee: Federal-Mogul Burscheid GbmH, Burscheid (DE)

( * ) Notice: Subject to any disclaimer, the term of this patent is extended or adjusted under 35 U.S.C. 154(b) by 0 days.

(21) Appl. No.: 09/935,607

(22) Filed: Aug. 24, 2001

(65) Prior Publication Data

US 2002/0041071 A1 Apr. 11, 2002

(30) Foreign Application Priority Data

Aug. 25, 2000 (DE) ........................................ 100 41 802

(51) Int. Cl.[7] ................................................. F16J 9/04
(52) U.S. Cl. ........................ 277/458; 277/490; 277/498
(58) Field of Search ................................. 277/458, 472, 277/474, 476, 490, 496, 498, 548

(56) References Cited

U.S. PATENT DOCUMENTS

| | | | | | |
|---|---|---|---|---|---|
| 1,220,153 A | * | 3/1917 | Cook | .......................... | 277/490 |
| 1,252,324 A | * | 1/1918 | Dake | .......................... | 277/474 |
| 1,371,066 A | * | 3/1921 | Bessinger | .................. | 277/446 |
| 1,378,894 A | | 5/1921 | Norman | | |
| 1,475,366 A | * | 11/1923 | Bessinger | .................. | 277/490 |
| 2,245,980 A | * | 6/1941 | Johnston | .................... | 277/458 |
| 2,325,298 A | * | 7/1943 | Barnes | ........................ | 277/471 |
| 4,240,644 A | * | 12/1980 | Busto | .......................... | 277/436 |
| 4,570,945 A | * | 2/1986 | Hayashi | ...................... | 277/486 |
| 5,664,536 A | * | 9/1997 | Bigsby | ...................... | 123/193.4 |
| 6,367,808 B1 | * | 4/2002 | Feistel | ........................ | 277/459 |

FOREIGN PATENT DOCUMENTS

| | | |
|---|---|---|
| EP | 0 253 069 | 1/1988 |
| JP | 00120866 | 4/2000 |

* cited by examiner

Primary Examiner—Robert J. Sandy
Assistant Examiner—André L. Jackson
(74) Attorney, Agent, or Firm—Venable LLP; Norman N. Kunitz

(57) ABSTRACT

A compression piston ring includes a ring gap defined by facing first and second end faces; a ring back situated diametrically opposite the ring gap; first and fourth quadrants extending from opposite sides of the ring gap and second and third quadrants extending from opposite sides of the ring back to the respective first and fourth quadrants. The first end face is situated in the first quadrant and the second end face is situated in the fourth quadrant. The wall thickness of the compression piston ring is reduced exclusively in the first and fourth quadrants.

8 Claims, 3 Drawing Sheets

COMPRESSION PISTON RING

CROSS REFERENCE TO RELATED APPLICATION

This application claims the priority of German Application No. 100 41 802.3 filed Aug. 25, 2000, which is incorporated herein by reference.

BACKGROUND OF THE INVENTION

This invention relates to a compression piston ring provided with a gap region and having cross-sectional changes along the ring circumference which is divided into four imaginary quadrants.

Japanese Published Patent Application 09196171-A discloses a piston ring which has a continuously decreasing wall thickness starting from the ring back and extending towards the ring gap.

A similar piston ring which, however, is composed of two different materials, is described in U.S. Pat. No. 1,278,015. The inner ring region is made of iron or steel and the outer ring region is made of a zinc layer. In this structure too, starting from the ring back, at least the inner part of the piston ring has a decreasing wall thickness extending from the ring back towards the ring gap.

U.S. Pat. No. 2,591,920 describes a piston ring which in the region of its radial end faces or in the region of its inner circumferential surface is provided with circumferential grooves or chamber-like chamfers. The dimension of the grooves or chamfers increases from the ring back towards the gap region.

In practice, in internal-combustion engines compression piston rings of constant wall thickness are widely used. To cause the piston rings to conform to cylinder deformations which may occur, the wall thickness of the piston rings must be reduced as viewed for the entire ring diameter. As a result, if spreading of the ring occurs, the tangential force is reduced or in the presence of a tangential force the extent of ring expansion (spreading) increases. In either case the following problems are encountered:

Insufficient sealing of the combustion chamber;
Difficulties in installing the compression piston ring;
Increased oil consumption;
Increased blowby; and
Ring fracture or ring flutter.

The above-outlined prior art show compression piston rings which also have the above-listed disadvantages as a result of the substantially total reduction of the ring cross section provided over the entire ring circumference.

The manner in which the piston ring is made to conform to the cylinder shape is based on its average shape-conforming capability. In piston rings having a constant wall thickness, a prediction concerning the shape-conforming capability is possible only for a "theoretical mid value"; the functional behavior of the piston ring, however, is dependent from the worst local conforming possibilities.

SUMMARY OF THE INVENTION

It is an object of the invention to provide an improved piston ring of the above-outlined type in which a significantly higher shape-conforming capability in the direction of the gap region is feasible without significantly lowering the tangential force.

This object and others to become apparent as the specification progresses, are accomplished by the invention, according to which, briefly stated, the compression piston ring includes a ring gap defined by facing first and second end faces; a ring back situated diametrically opposite the ring gap; first and fourth quadrants extending from opposite sides of the ring gap and second and third quadrants extending from opposite sides of the ring back to the respective first and fourth quadrants. The first end face is situated in the first quadrant and the second end face is situated in the fourth quadrant.

The wall thickness of the compression piston ring is reduced exclusively in the first and fourth quadrants.

The cross-sectional reduction of the ring wall thickness limited, according to the invention, to the first and fourth quadrants of the ring circumference provides that the ring is capable of better adapting itself to increased cylinder deformations and thus ensures a better sealing of the combustion chamber. At the same time, the shape-conforming capability is increased whereby an overall increased shape-conforming capability for the entire ring circumference is obtained without significantly reducing the tangential force compared to a piston ring having a non-reduced wall thickness.

By virtue of the shape of the cross-sectional reduction in the first and fourth quadrants (which is designed as a function of the mode of application) a purposeful approximation of a predeterminable middle value of the shape-conforming capability of the piston ring may be obtained. The type and configuration of the cross-sectional reduction in the first and fourth quadrants may vary as required, based on the ring cross section and the surface moments of inertia.

DESCRIPTION OF THE PREFERRED EMBODIMENT

Figure 1:
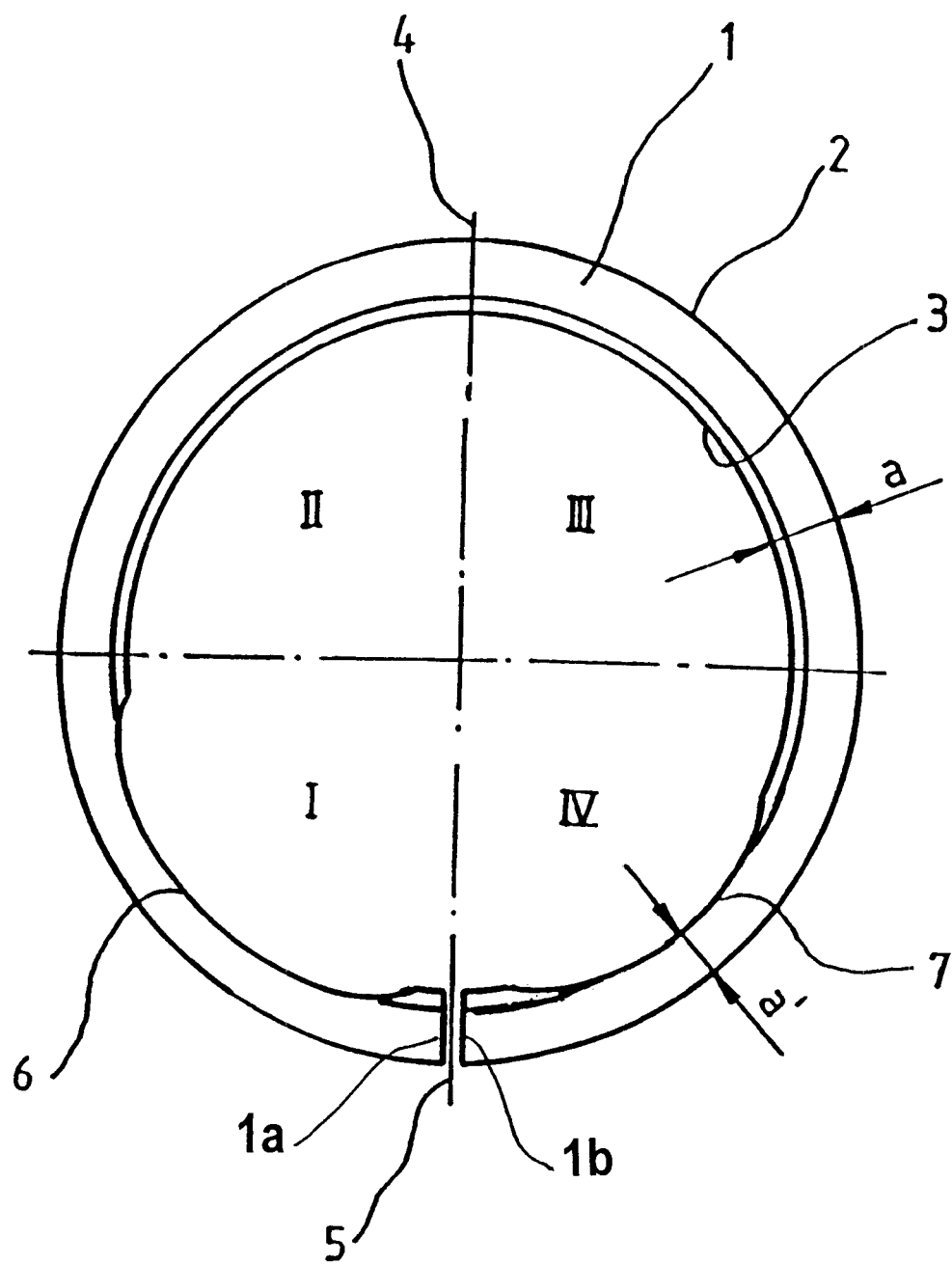
FIG. 1 is a top plan view of a preferred embodiment of the invention.
Figure 2:
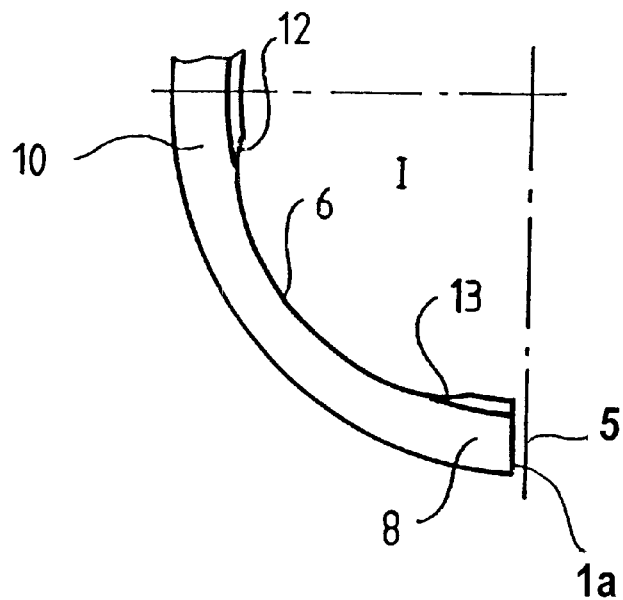
FIGS. 2 and 3 are partial top plan views of the respective first and fourth quadrants of the structure shown in FIG. 1.
Figure 3:
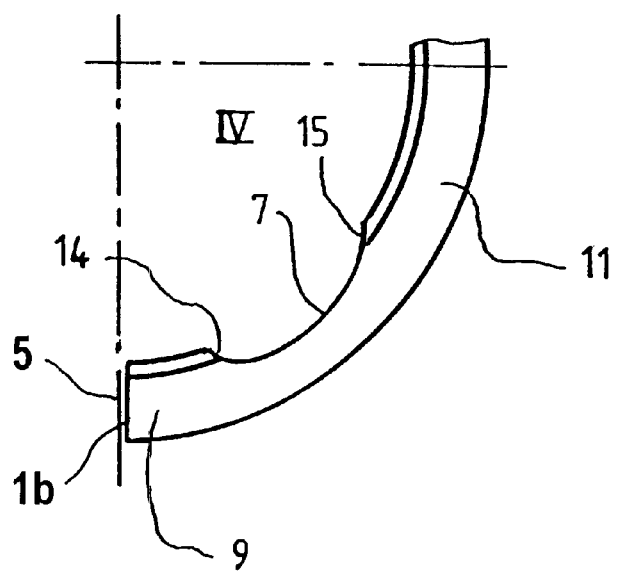

FIGS. 1, 2 and 3 show a compression piston ring 1, whose circumference is divided into four quadrants I, II, III and IV. The compression piston ring 1 has an outer circumferential face 2 and an inner circumferential face 3. The circumferential faces 2 and 3 define a predetermined radial wall thickness a of the ring 1. Starting in opposite directions from the ring back 4 which is situated diametrically opposite the ring gap 5, the thickness a is maintained essentially to the beginning of quadrants I and IV, respectively. In quadrants I and IV, however, which contain the respective ring end faces 1a and 1b that define the ring gap 5, starting approximately from the end of the respective quadrants II and III, the wall thickness decreases to a minimum wall thickness a' in the direction of the ring gap 5. In the region of the ring gap 5 the radial wall thickness is once again a. The local cross-sectional thickness reduction provided exclusively in the quadrants I and IV is designated at 6 and 7, respectively.

The local radial thickness reductions 6 and 7 are slightly different from one another in the illustrated examples of FIGS. 2 and 3. Thus, the circumferential length of the reduction 6 is greater than that of the reduction 7. The ring zones which adjoin the ring gap 5 on either side, that is, the zone 8 in the quadrant I and the zone 9 in the quadrant IV have a shorter circumferential length than the respective ring zones 10 and 11 which are situated in the quadrants I and IV and which adjoin the quadrants II and III. The regions 8–11 have the non-reduced wall thickness a. The transitional regions 12, 13, 14, 15 from the full wall thickness a to the reduced regions 6, 7 are circularly rounded.

Other contour configurations of the local thickness reduction are feasible. Also, several, serially arranged thickness reductions may be present which, for example, may merge into one another.

Figure 4:
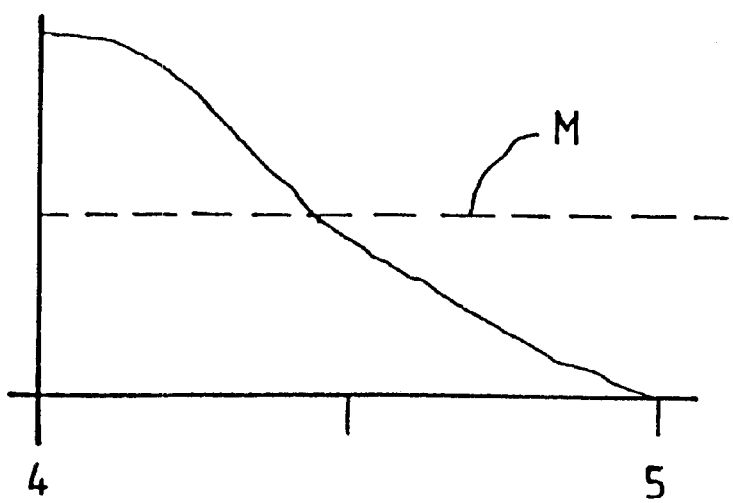
FIGS. 4 and 5 are graphs illustrating the shape-conforming capability of a piston ring having a constant wall thickness as compared to a piston ring provided with a local cross-sectional reduction according to the invention.
Figure 5:
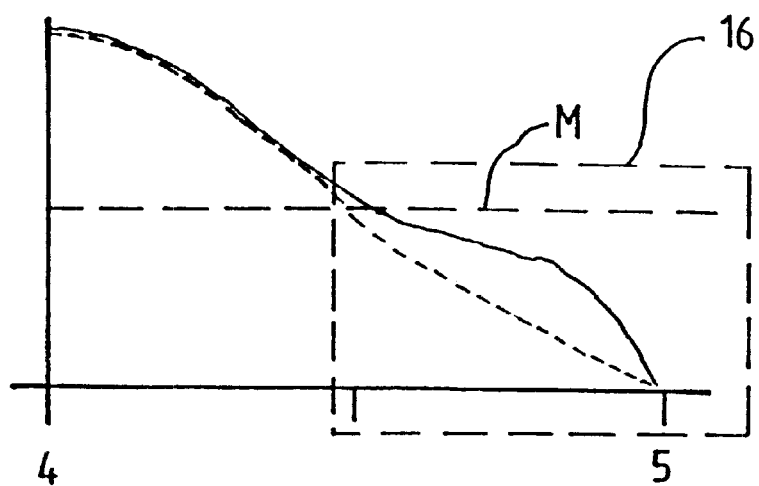

FIGS. 4 and 5 show comparative graphs of the shape-conforming capability of a compression piston ring having throughout a constant wall thickness a (FIG. 4) and a compression piston ring having local reduced thicknesses a' according to the invention (FIG. 5).

As noted earlier in the introduction of the description, the manner of adaptation of a compression piston ring to the shape of the cylinder wall is based on the average shape-conforming capability of the ring. In compression piston rings having a constant wall thickness a, a prediction for the shape-conforming capability is possible only for a mid value M shown in broken lines in FIG. 4. Yet, the functioning behavior of a compression piston ring depends from the locally worst shape-conforming capability. As it may be seen from FIG. 4, the shape-conforming capability to adapt to cylinder deformations decreases from the ring back 4 to the ring gap 5. The desired mid value cannot be obtained for the entire circumference of the piston ring. The increase of the desired mid value by reducing the ring cross section is represented by the formula $$I = \frac{b \cdot h^3}{12}$$

Such a reduction results only in a limited improvement.

The disadvantages of a significant spreading or, when the extent of spreading remains the same, of a reduction of the own tangential force to achieve an elevated mid value also involve the drawback concerning the sealing of the combustion chamber.

By providing a compression piston ring with local cross-sectional reductions according to the invention, that is, exclusively in quadrants I and IV, a significantly higher shape-conforming capability may be attained, starting from the ring back and extending towards the ring gap. In this manner, according to the definition of the cross-sectional reduction in quadrants I and IV, a purposeful approximation to the desired mid value may be reached without lowering the tangential force as compared to a ring which has an unreduced wall thickness. The type and configuration of the cross-sectional reduction in quadrants I (first quadrant) and IV (fourth quadrant) may be varied based on the different ring cross sections and thus based on the respective surface moments of inertia. In FIG. 5 the area enclosed by broken lines 16 represents the desired region.

It will be understood that the above description of the present invention is susceptible to various modifications, changes and adaptations, and the same are intended to be comprehended within the meaning and range of equivalents of the appended claims.

What is claimed is:

1. A compression piston ring comprising:
    (a) a ring gap defined by facing first and second end faces,
    (b) a ring back situated diametrically opposite said ring gap:
    (c) first and fourth quadrants extending from opposite sides of said ring gap; said first end face being situated in said first quadrant and said second end face being situated in said fourth quadrant,
    (d) second and third quadrants extending from opposite sides of said ring back to said first and fourth quadrants, respectively,
    (e) a ring thickness reduction provided along circumferential ring length portions exclusively in said first and fourth quadrants; and
    (f) terminal circumferential ring length portions containing said first and second end faces that are void of thickness reduction.

2. The compression piston ring as defined in claim 1, wherein said terminal circumferential ring length portions are first circumferential ring length portions; further comprising second circumferential ring length portions void of thickness reduction in said first and fourth quadrants; each thickness reduction in said first and fourth quadrants being bordered by respective first and second circumferential ring length portions; in said first quadrant said first circumferential ring length portion being shorter than said second circumferential ring length portion and in said fourth quadrant said first circumferential ring length portion being shorter than said second circumferential ring length portion.

3. The compression piston ring as defined in claim 2, wherein the circumferential length of the thickness reduction in said first quadrant is longer than the circumferential length of the thickness reduction in said fourth quadrant.

4. The compression piston ring as defined in claim 1, wherein a transition from a circumferential ring portion of non-reduced thickness to a circumferential ring portion of reduced thickness is identical in the first and fourth quadrants.

5. The compression ring as defined in claim 1, wherein a transition from a circumferential ring portion of non-reduced thickness to a circumferential ring portion of reduced thickness is different in the first and fourth quadrants.

6. The compression ring as defined in claim 1, wherein a circumferential length of a minimum, reduced thickness extends approximately through one half the circumferential length of said first and fourth quadrants.

7. The compression ring as defined in claim 1, wherein transitions from a circumferential ring portion of non-reduced thickness to a circumferential ring portion of reduced thickness are rounded.

8. The compression piston ring as defined in claim 1, wherein transitions from a circumferential ring portion of non-reduced thickness to a circumferential ring portion of reduced thickness are circularly rounded.

* * * * *